US008239431B2

(12) United States Patent
Nomura

(10) Patent No.: US 8,239,431 B2
(45) Date of Patent: Aug. 7, 2012

(54) MESSAGE DELIVERY SYSTEM AND METHOD FOR DELIVERING MESSAGE

(75) Inventor: Jikou Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 134 days.

(21) Appl. No.: 12/702,583

(22) Filed: Feb. 9, 2010

(65) Prior Publication Data
US 2010/0179988 A1 Jul. 15, 2010

Related U.S. Application Data

(63) Continuation of application No. PCT/JP2007/065642, filed on Aug. 9, 2007.

(51) Int. Cl.
*G06F 15/16* (2006.01)
(52) U.S. Cl. ...................................... 708/206
(58) Field of Classification Search ............ 709/206
See application file for complete search history.

(56) References Cited

U.S. PATENT DOCUMENTS

| 7,917,153 B2 * | 3/2011 | Orwant et al. ............. 455/456.1 |
| 2004/0018847 A1 * | 1/2004 | Chang ............................. 455/466 |
| 2006/0229058 A1 * | 10/2006 | Rosenberg ................. 455/404.2 |
| 2007/0294347 A1 * | 12/2007 | Shinnishi ...................... 709/204 |

FOREIGN PATENT DOCUMENTS

| JP | 9-214423 A | 8/1997 |
| JP | 2002-171220 A | 6/2002 |
| JP | 2002-278886 A1 | 9/2002 |
| JP | 2004-201199 A | 7/2004 |
| JP | 2005-253006 A | 9/2005 |
| JP | 2005-346634 A | 12/2005 |
| JP | 2006-268229 A | 10/2006 |
| WO | WO-03/100657 | 12/2003 |

OTHER PUBLICATIONS

International Search Report of PCT/JP2007/065642, mailing date of Oct. 30, 2007.
Japanese Office Action dated Sep. 20, 2011, issued in corresponding Japanese Patent Application No. 2009-526317.
"Japanese Office Action" mailed by JPO and corresponding to Japanese application No. 2009-526317 on May 29, 2012, with partial English translation.

* cited by examiner

*Primary Examiner* — Larry Donaghue
(74) *Attorney, Agent, or Firm* — Fujitsu Patent Center

(57) ABSTRACT

A message delivery system includes a plurality of terminals and a server communicating the terminals. Each of the terminals includes a message creation function unit creating a message for any member of a registered group, and a message delivery request function unit designating any location as a designated location and requesting a server to deliver the message to a member of the registered group entering the designated location. The server includes an entry monitoring function unit monitoring if a member of the registered group has entered the designated location, and a message delivery function unit delivering the message to a member of the registered group first entering the designated location and, if the first entering member refuses to accept the message, delivering the message to another member of the group next entering the designated area.

8 Claims, 10 Drawing Sheets

MESSAGE DELIVERY SYSTEM AND METHOD FOR DELIVERING MESSAGE

CROSS-REFERENCE TO RELATED APPLICATION

This application is a continuation application and is based upon PCT/JP2007/065642, filed on Aug. 9, 2007, the entire contents of which are incorporated herein by reference.

FIELD

The embodiments discussed herein relates to a messaging system, more particularly relates to a messaging system using mobile communication.

BACKGROUND e-mail is an important means of communication in the PDC (Personal Digital Cellular), GSM (Global System for Mobile Communications), or WCDMA (Wideband Code Division Multiple Access), CDMA20001X (Code Division Multiple Access 2000X), and other 3G (3rd Generation) mobile communication systems.

In protocol relating to e-mail, that is, TCP/IP (Transmission Control Protocol/Internet Protocol) specifications, a single user is bound to unique single addresses to create mail addresses. Further, it is also possible to bind addresses of a plurality of users to a unique single address to create mailing lists having the unique single address as a representative address.

A message sender can transmit a message to that address so as to deliver the message to the desired other party, more precisely the POP server with which the message receiver holds an account. Furthermore, at the time of transmission of the message, he or she can send the same message to a plurality of parties by designating a plurality of addresses.

When a mailing list has been created, it is possible to send a message to all members of the mailing list just by sending the message to the representative address assigned to the mailing list. The function of sending an e-mail to a mail address or mailing list is provided not only at computers and PDA's (Personal Digital Assistants) with an operating system, but also at mobile phones. Users can now send messages by e-mail without regard as to the time or location.

For example, if utilizing a mobile phone and utilizing a mailing list, it is possible to send a message relatively efficiently to a plurality of people without regard as to the time or location. Further, it is possible to send a message to members selected by inputting conditions to the mobile phone for extracting the members included on the mailing list.

However, when desiring to request to a plurality of members a job which just one or several of the members can perform, sometimes just having a mailing list is not enough.

For example, assume that all family members including a user X are made members of a mailing list. Sometimes the user X at home would like someone in the family returning home from the nearest train station, that is, one of the members of the mailing list, to make a purchase at a store on route from the nearest train station to home. If mailing all members on the mailing list, it becomes necessary for all members to communicate in order to decide who should make the purchase. If insufficiently communicating with each other, the same item may be purchased several times. Further, everyone might assume someone else would do the job and no one would make the purchase. Furthermore, even members in the mailing list definitely unable to make the purchase would also be sent the message resulting in wasted traffic. To avoid such wasted traffic, it is possible not to use the mailing list, but to send a message to each feasible member, but this would be inefficient.

As will be understood from this example, when it is sufficient for just one of a plurality of persons to accept an errand, it is impossible under the current setup to deal with the errand by sending a single message.

A communication system is known which prevents a user from passing by an electronic message board or a message addressed to the user without noticing it by identifying the user entering a predetermined area and performing a predetermined action with respect to the user to draw the user's attention to the message addressed to the user (see Patent Document 1).

[Patent Document 1] Japanese Laid-open Patent Publication No. 2005-253006

SUMMARY

According to an aspect of the embodiment, a message delivery system includes a plurality of terminals and a server communicating the terminals, each of the terminals includes a message creation function unit creating a message for any member of a registered group and a message delivery request function unit designating any location as a designated location and requesting a server to deliver the message to a member of the registered group entering the designated location, and the server includes an entry monitoring function unit monitoring if a member of a registered group has entered the designated location and a message delivery function unit delivering the message to a member of the registered group first entering the designated location and, if the first entering member refuses to accept the message, delivering the message to another member of the group next entering the designated area.

According to an aspect of the embodiment, a message delivery method includes monitoring if a member of a registered group has entered a designated location, delivering a message to the member of the registered group first entering the designated location, and delivering the message to another member of the group next entering the designated area if the first entering member refuses to accept the message.

According to an aspect of the embodiment, a terminal includes a message creation function unit creating a message for any member of a group and a message delivery request function unit designating any location as a designated location and requesting a server to deliver the message to a member of the group entering the designated location.

According to an aspect of the embodiment, a server includes an entry monitoring function unit monitoring if a member of a registered group has entered a designated location and a message delivery function unit delivering a message to the member of a registered group first entering the designated location and, if the first entering member refuses to accept the message, delivering the message to another member of the group next entering the designated area.

The object and advantages of the embodiments will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
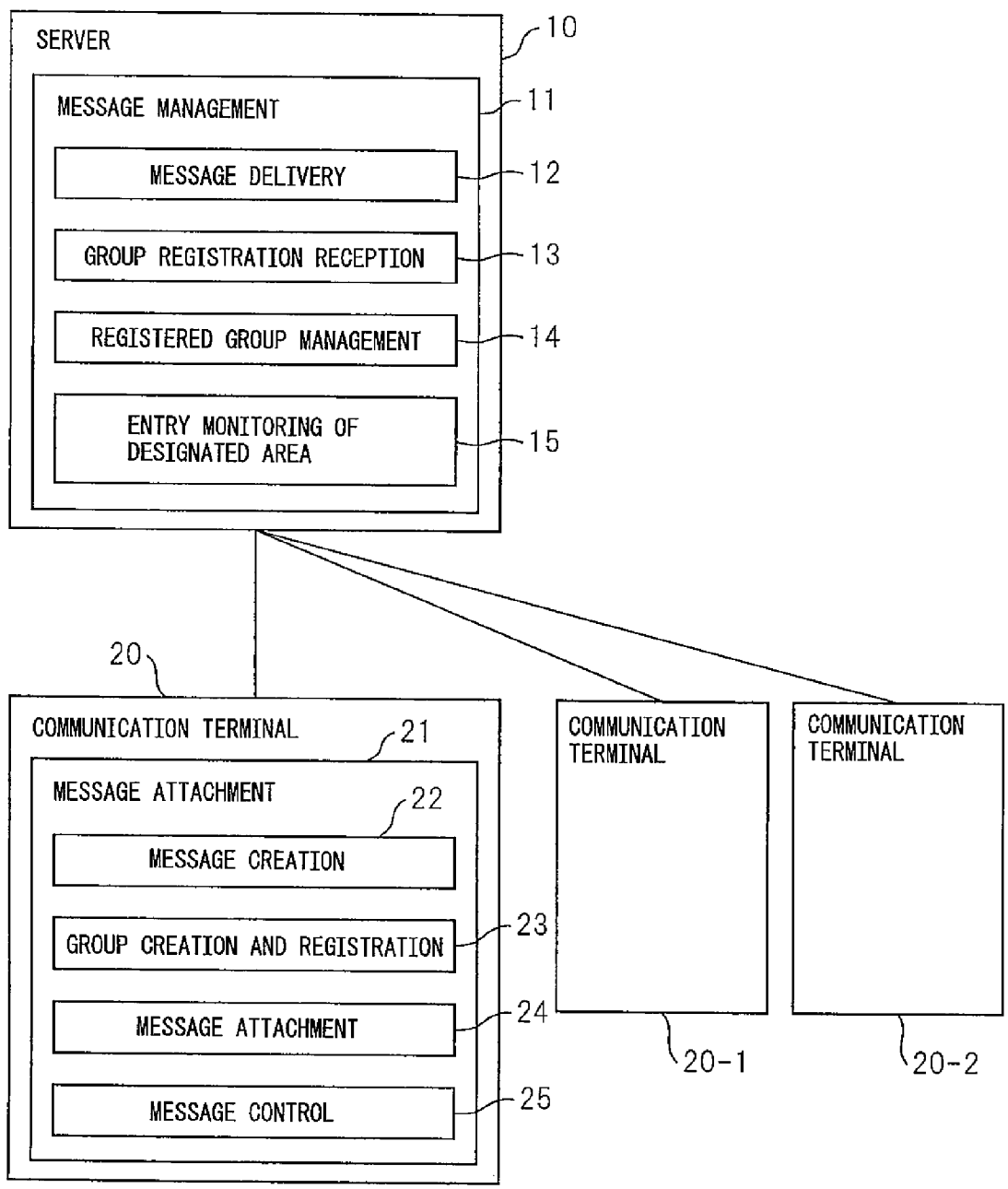
FIG. 1 is a view illustrating a message delivery system including a server and a plurality of communication terminals according to an embodiment.

FIG. 1 is a view illustrating a message delivery system according to an embodiment. As illustrated in FIG. 1, the system includes a plurality of communication terminals 20, 20-1, 20-2 such as mobile phones, PDA's, PC's, or other terminals having e-mail functions and a server 10 able to communicate with the plurality of communication terminals 20, 20-1, 20-2 and perform services according to the present embodiment. In FIG. 1, three communication terminals 20, 20-1, 20-2 are shown, but there may be any number of communication terminals. The server 10 can handle any number of communication terminals.

The communication terminal 20 is provided with a message attachment module 21 able to designate a receiving location and send a message to a group in which the user of the communication terminal 20 is registered. The term "message attachment" expresses having a message according to the present embodiment received only at a designated location, so having a message given, that is, attached, to a designated location. The message attachment module 21 is realized by message attachment application software operating on the communication terminal 20. The message attachment application is loaded into a memory (not shown) of the communication terminal 20 and makes the CPU (central processor unit) (not shown) of the communication terminal 20 operate. The operation of the message attachment module 21 will be explained later.

The message attachment module 21 includes a message creation function unit 22 having a function of creating a message, a group creation and registration function unit 23 having a function of creating a group and registering the group at a server, a message attachment function unit 24 having a message attachment function attaching a message to a designated area, and a message control unit 25 having a function of receiving and replying to a message delivered from the server 10.

The server 10 includes a message management module 11 managing execution of a message service performed in accordance with a request from a communication terminal 20. Below, the message service performed by the message management module 11 will be referred to as a "message attachment service". The message management module 11 is realized by a server software application, that is, a message management application. The message management application is loaded into a memory (not shown) of the server 10 and operates the CPU (central processor unit) (not shown) of the server 10. The operation of the message management module 11 will be explained later.

The message management module 11 is constantly operating and provides services requested by the message attachment module 21 of the communication terminal 20. The message management module 11 includes a message delivery function unit 12 having a function of delivering a message to a communication terminal 20 of a member entering a designated location or designated area, a group registration reception function unit 13 having a function of receiving registration of a group created and registered by the group creation and registration function unit 23 of the communication terminal 20, a registered group management function unit 14 having a function of managing a registered group and its members, and a terminal entry monitoring function unit 15 having a function of monitoring whether a communication terminal 20 of a member of the group has entered the designated area.

Figure 2:
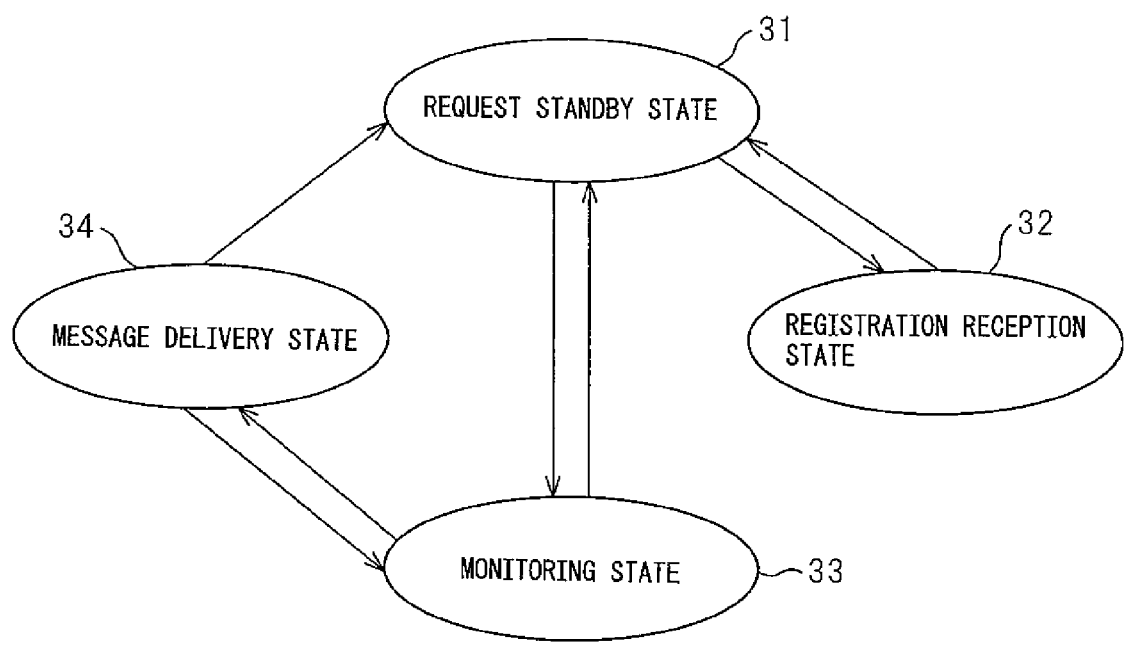
FIG. 2 is a view illustrating state transition of a server of an embodiment.

FIG. 2 is a view illustrating state transition of the server. States of the server 10 includes a request standby state 31 of standing by for a request for service from a communication terminal 20, a registration reception state 32 of receiving registration of a group from the communication terminal 20, a monitoring state 33 of monitoring for entry of the communication terminal 20, and a delivery state 34 of delivering a message to the communication terminal 20.

The request standby state 31 is the state of standing by for a request from a communication terminal 20. If a request for group registration is sent from a communication terminal 20, the server 10 shifts to the registration reception state 32. The registration reception state 32 shifts to the request standby state 31 when the server 10 completes registration reception processing.

Further, when the server 10 in the registration reception state 31 receives a request from a communication terminal 20 to deliver a message to a group designating a location, the server 10 shifts to a monitoring state 33 of monitoring for entry of a member of the group into the designated location. The monitoring state 33 confirms that a member of a group has entered the designated location and shifts to the message delivery state 34. The server 10 shifts from the monitoring state 33 to the request standby state 31, when a member who has once returned the message will later accept that message.

When the server 10 in the message delivery state 34 delivers the message to a member entering the designated location and the member receiving that message accepts the message, the server 10 shifts to the request standby state 31. When the member receiving the message returns the message to the server 10, the server 10 must continue the monitoring, so shifts to the monitoring state 33.

Referring to FIGS. 3 to 10, the operation of the present embodiment will be explained. In the drawings, the users A to E indicates users having communication terminals 20 of the present embodiment.

(Group Creation and Registration)

Figure 3:
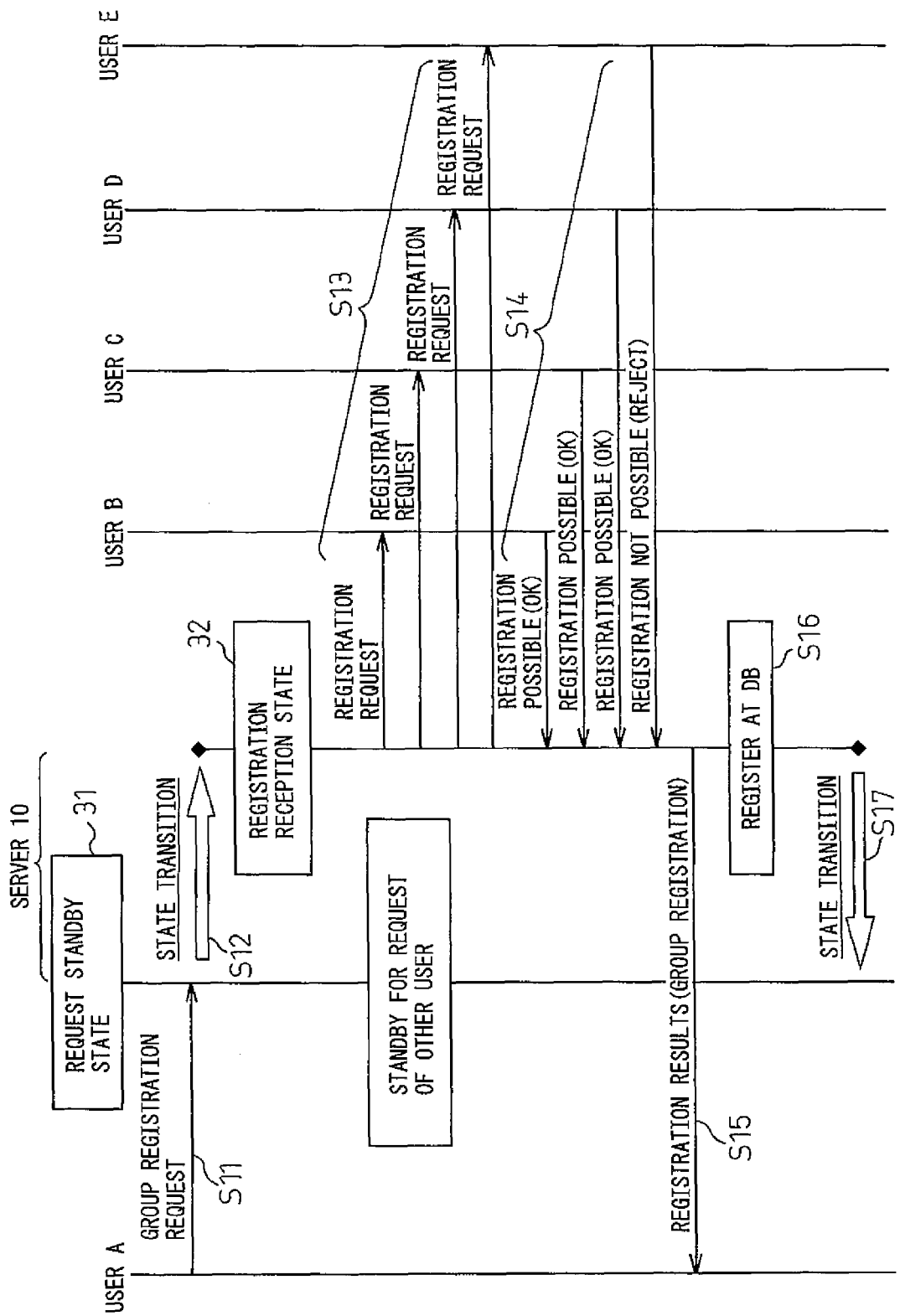
FIG. 3 is a view illustrating a flow of group registration according to an embodiment.

FIG. 3 illustrates an operation from when a user creates a group and requests group registration to when the group is registered. In FIG. 3, the group creator is indicated as the "user A". Before the user A requests group registration, the user A uses the group creation and registration function unit 23 of the communication terminal 20 of the user A to create a group to which the message is sent. For example, any group can be created such as a family, a department in a company, members of a sports club, or a group of volunteers.

In the present embodiment, to secure security of the group or group members, it is possible to set attributes to the created group. The attributes include, for example, the following (1) to (3).

(1) Enabling the group to be sent messages only from members in the group.
(2) Requiring user authentication when attaching a message to a designated area or when viewing member information.
(3) Enabling a group representative, manager, or group creator to view a message addressed to the group in advance and enabling the message to be discarded before the message being sent to the group.

When setting the attribute of item (1) when creating a group, it is possible to reject message attachment from a user not belonging to the group. When not setting the attribute of the item (1), even a user outside the group who is not a member can utilize the message attachment service for the group if joining the message attachment service.

When setting the attribute of item (2) when creating a group, when a user tries to attach a message to a designated area, the server requests a password. The password can be set by using the message control function unit 25 of the message attachment module 21 of the communication terminal 20 of the user when receiving from the server confirmation of group member registration. User authentication is performed using the set password. If succeeding in user authentication, the user can attach the message. In other words, the server will accept the message attachment.

Further, to view information of the group members stored in the server, a user uses the message control function unit 25 of the message attachment module 21 to request viewing of the information of the group members to the server 10. Information of the group members can be viewed no matter what state the server 10 is in. When setting the attribute of the item (2), the server 10 receiving a request for viewing group member information requests a password from the requesting user and authenticates him or her. If succeeding in personal authentication of a requesting user, the server sends the group member information, that is, the addresses of all of the group members and their IDs, to the requesting user.

When setting the attribute of item (3) when creating a group, if the message is attached to a designated area, the server sends the attached message to the group representative. The group representative uses the message control function unit 25 of the message attachment module 21 of the communication terminal 20 of the group representative to check the message attachment and judge if the message attachment is permittable. If rejected by the group representative, the message is discarded and the server notifies the message sender that the message is discarded. In this case, the server 10 does not shift from the request standby state. If the group representative approves the message, the server starts processing of the message attachment service.

These items can be individually selected. The group creator can set the selected items as attributes when creating the group. The attributes set for a group are not limited to these. If necessary, it is also possible to set other attributes.

The user A of FIG. 3 first uses the group creation and registration function unit 23 of his own communication terminal 20 to select the desired members and create a group. For example, the user A can assemble existing addresses to create a group. Next, the user A sends a group registration request to the server 10 (S11). In the server 10, the message service provider starts up the message management module 11 in advance, so the server 10 is already shifting to the request standby state 31. If the server 10 receives a request for group creation from the user A, the server 10 starts up another process or sub process and shifts to the registration reception state 32 (S12). In the present embodiment, the parent process of the server 10 is constantly in a request standby state. When shifting to another state, the server 10 starts up another process.

When the server 10 shifts to the registration reception state 32, the group registration reception function unit 13 of the server 10 delivers a message notifying the fact of the group registration request and the group attributes to the users B to D expected to participate as members of the group for which registration is requested (S13).

The users B to D use the message control function units 25 of their communication terminals 20 to receive the message of the group registration request. Next, the users B to D consider the members of the group to be created, the attributes of the group, etc., judge whether to participate in the group, and reply to the server for confirmation of registration (S14).

If rejecting participation in the group, a user cannot become a group member. When agreeing to registration as a group member, the user sets his or her own ID (Identification Data) and replies to the server. The ID is unique bound information bound to the address of the registered member. A user becoming a member can set a name or nickname for the ID when desiring to inform other members that he or she is an address holder.

After confirmation of registration of all users expected as group members has ended, the results of registration are sent to the group creator (S15). The group is established by two or more users agreeing to become members. The server 10 uses the registered group management function unit 14 managing registered groups and their members to register the group and its members in its own database (S16). When registration ends, the server 10 ends the separately started up process for registration reception and shifts from the registration reception state 32 to the request standby state 31 (S17).

(Creation of message for group and attachment to designated location)

Figure 4:
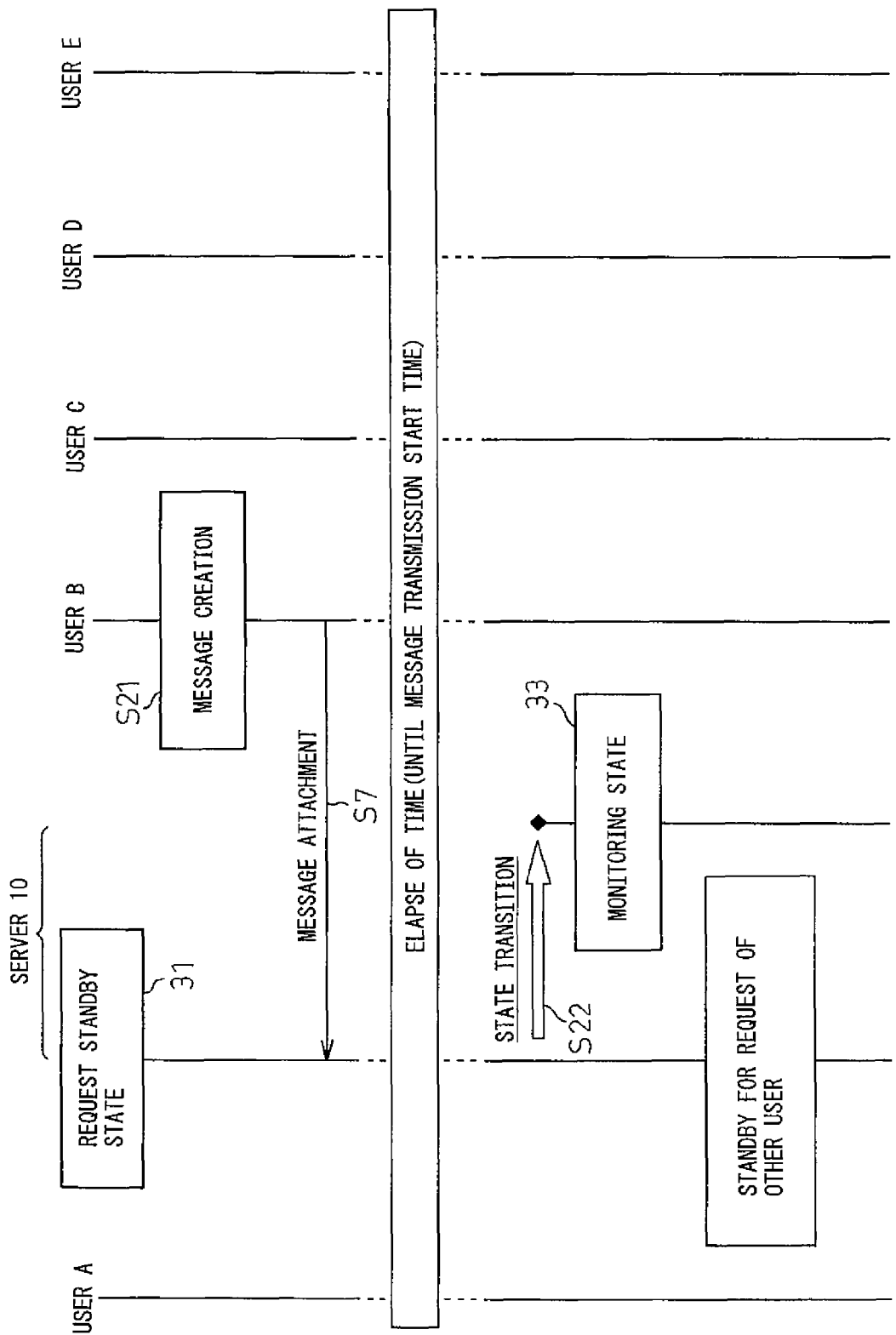
FIG. 4 is a view illustrating a flow of operation of an embodiment shifting to the monitoring state after message attachment.

FIG. 4 is a view illustrating an operation for creation of a message and attachment to a designated location. When a group is registered at the server, the group can be sent messages. If setting the above attributes (1) and (2), the group can be sent messages by only members in the group. Further, when sending a message, it is possible to require personal authentication. In FIG. 4, assume as one example that one member of the group, that is, the user B, is the message sender. The message sender, the user B, uses the message creation function unit 22 of the message attachment module 21 provided at the communication terminal 20 of the user B to create a message (S21). The message may be created by any media such as mpeg 4, AVI, and other images, jpeg, png, and other still images, audio, and text. It is possible to use the message creation function unit 22 to convert any media and package them in a single message.

The user B next uses the message attachment function unit 24 to attach the created message to a designated location or designated area. The message attachment function designates a group and location or area for the message and delivers the message to the member of the group first entering the designated location. For example, if making the designated location a train station, it is possible to deliver the message to the member first arriving at that station to make some sort of request to him or her. Further, if making the designated location a certain region, it is possible to make some sort of request to the member first entering that region. If there are already several members of the group at a designated location or if a plurality of members simultaneously enter a designated location, the message can be delivered to one member among them. The member to which the message is delivered in this case may also be randomly selected. It is also possible to designate a certain order in advance and deliver the message to the members in that order.

The location to which the message is attached may be selected by the image of a map displayed on the display screen of the communication terminal 20 of the user B desiring attachment of a message. For example, it is possible to mark any position on the map by any input means so as to set a marking point and thereby select the designated location. Further, instead of selection from a map, the communication terminal 20 of the user B may also be used to designate a location by direct input of an address. For the image of the map displayed on the display screen of the communication terminal 20, the current location is displayed by default. Therefore, when specifying the current location as the attachment location, it is possible to designate the attachment as the default one so as to designate the current location as the attachment location. When designating another location other than the current location, a map displaying the other location is displayed on the screen of the communication terminal. Along with designation of the location for attachment of the message, it is also possible to designate the time period for attachment, that is, the time for start of delivery of the attached message and the time for end of the delivery, as an allowable transmission time. By designating the allowable transmission time, it is possible to deliver a message to only members of the group entering the designated location within the designated time period. Further, it is possible to select and designate a plurality of members for delivery of the attached message from the members of the group. When designating members for delivery of the message, even if another member other than the designated members of the group enters the designated location, the other member will not be delivered the message.

If the user B uses the message attachment function unit 24 to attach a message to a designated location, the group or designated members of the group to which the message is sent, the allowable transmission time during which the message can be sent, the body of the message, and the positional information of the designated location to which the message is attached are sent to the server 10 (S7). When receiving this information, the server 10 first checks the allowable message transmission time.

When not the message transmission start time, the server 10 continues the request standby state as it is. When the message transmission start time is reached or when already the start time at the time of request of attachment, the server 10 starts up a sub process or separate process for monitoring entry and shifts to the monitoring state 33 (S22). When setting the attribute (3), the server 10 can have the message for which delivery is requested viewed by the representative of that group and can shift to the monitoring state after obtaining permission of the representative. Then, entry monitoring is performed for monitoring if a member of the group is present in the designated location. The server 10 monitors the location or area matching with the designated positional information. Usually the designated location or designated area is equal to the monitored area. However, the monitored area may also be made wider than the designated area.

(Delivery of Message to Member Entering Designated Location)

Figure 5:
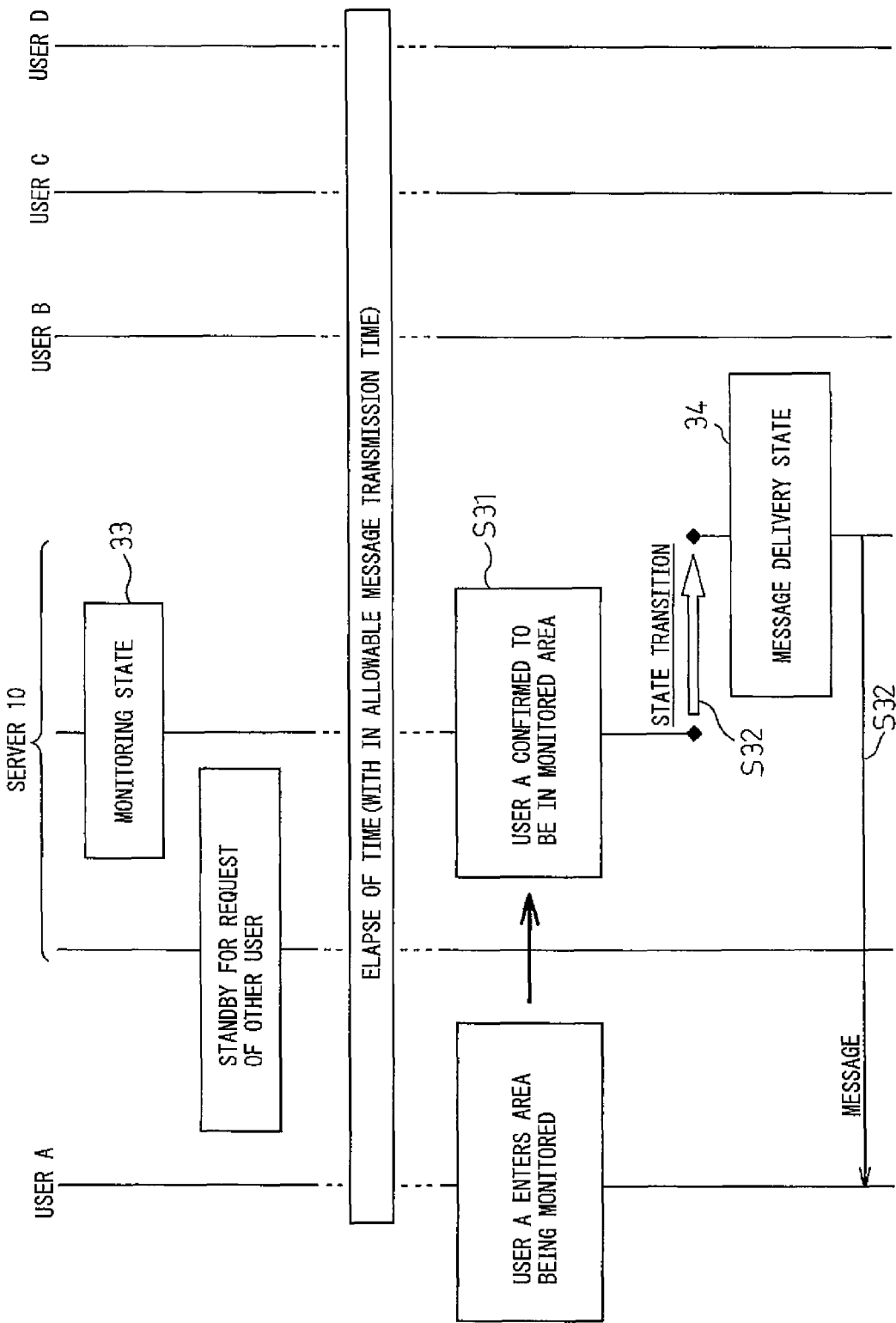
FIG. 5 is a view illustrating a flow of operation of an embodiment delivering a message to a user confirmed to be present in a monitored area.

FIG. 5 is a view illustrating an operation where the server shifts from the entry monitoring state to the message delivery state and delivers the message. The server confirms the first entry of a member of the designated group in the designated location or designated area being monitored during the allowable message transmission time (S31). In FIG. 5, the member first entering the designated area being monitored is the user A. If confirming the member entering the designated area, the server shifts to the message delivery state 34 (S32). Further, the message delivery function unit 12 of the server 10 delivers the message from the sender and the allowable message transmission time to the member entering the designated area, that is, the user A (S32). The allowable message transmission time period is notified to the user A because if the allowable message transmission time period has elapsed, the message attachment service will end and a member receiving the message will no longer be able to reply. As explained later, even if a once accepted message is returned, the server shifts to the entry monitoring state. In this case as well, if confirming that a member has first entered the area after a message is returned, the server shifts to the message delivery state and sends the message to this member.

The user A uses the message control function unit 25 of the communication terminal 20 of the user A to receive a message. If the transmitted message is comprised of a plurality of media, it is also possible to use the message control function unit 25 of the application of the communication terminal 20 to select and receive the media.

Figure 6:
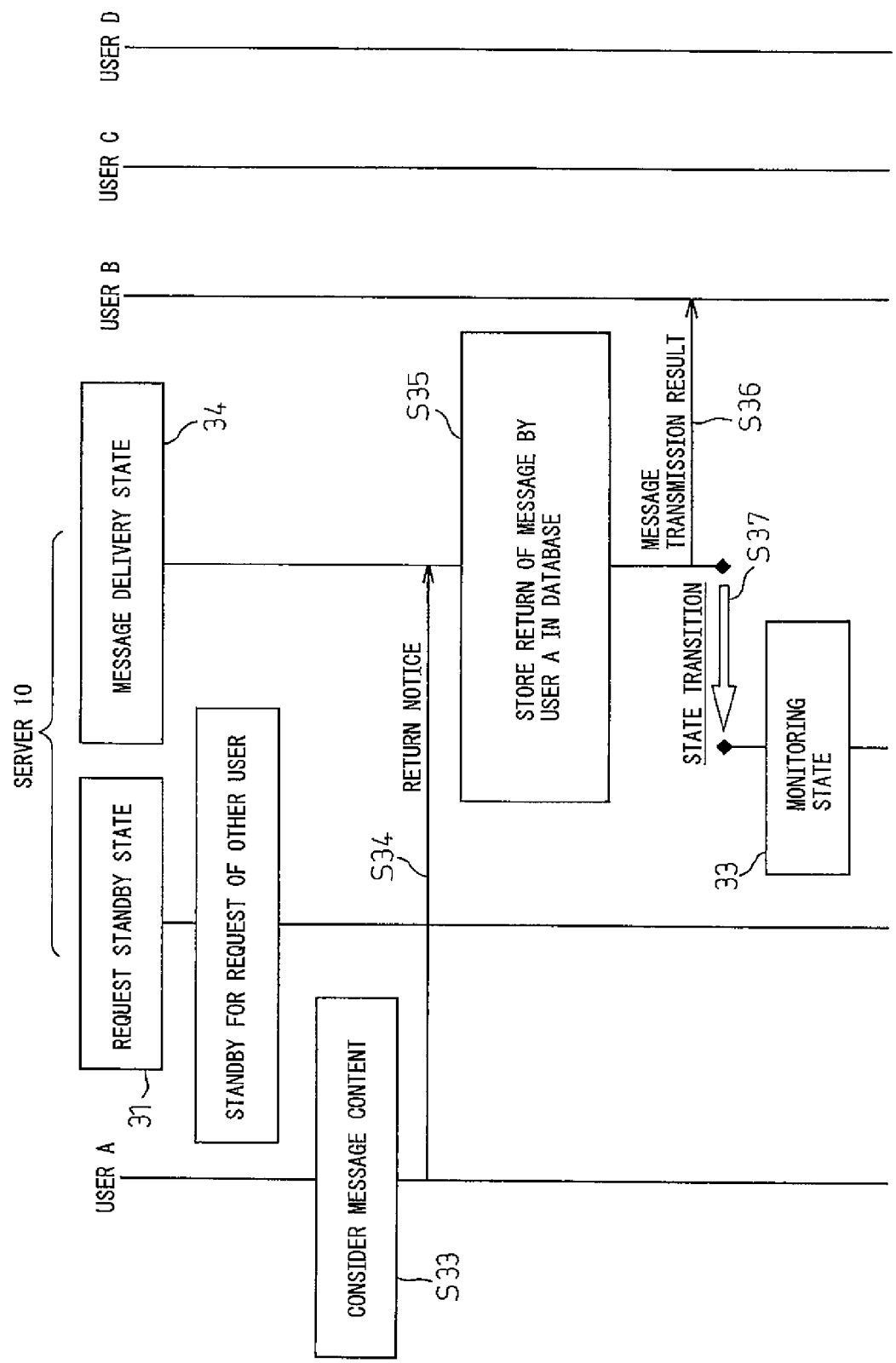
FIG. 6 is a view illustrating a flow of operation of an embodiment in the case where a user receiving a message refuses the message.

FIG. 6 is a view illustrating the operation in the case where a member receiving a message in the designated area rejects acceptance of the message. The member receiving the message in the designated area can consider the message content and judge whether to accept that message. FIG. 6 illustrates the process when accepting the message.

The user A receiving the message in the designated area confirms the message content and the allowable transmission time and considers the message content (S33). As a result, if rejecting acceptance of the message, a message return notice is sent to the server 10 in the message delivery state (S34). At this time, the user A can attach a reply message describing the reasons why the user A cannot accept the message. In the present embodiment, even if returning a message, the message is stored in the terminal 20 of the user A. The user A can accept the returned message depending on the subsequent situation.

The server 10 stores the fact that the user A returned the message in the database (S35). Next, the server 10 uses the message delivery function unit 12 and the registered group management function unit 14 to notify the sender of that message, that is, the user B, that acceptance of the message has been refused as a result of transmission of the message (S36). When a reply message is attached to the return notice, the user B is also notified of the reply message. The server 10 checks the allowable message transmission time and, when the allowable message transmission time does not end, again shifts to the monitoring state (S37).

The server 10 in the monitoring state monitors entry as illustrated in FIG. 5. Therefore, if there is a member next arriving at the designated area, the server 10 confirms that he or she is in the designated area. The confirmed member then receives the message. A member once returning a message is not sent the message again even if again entering the monitored area within the allowable message transmission time. When the allowable message transmission time ends, the server ends the monitoring process and shifts to the request standby state 31.

Figure 7:
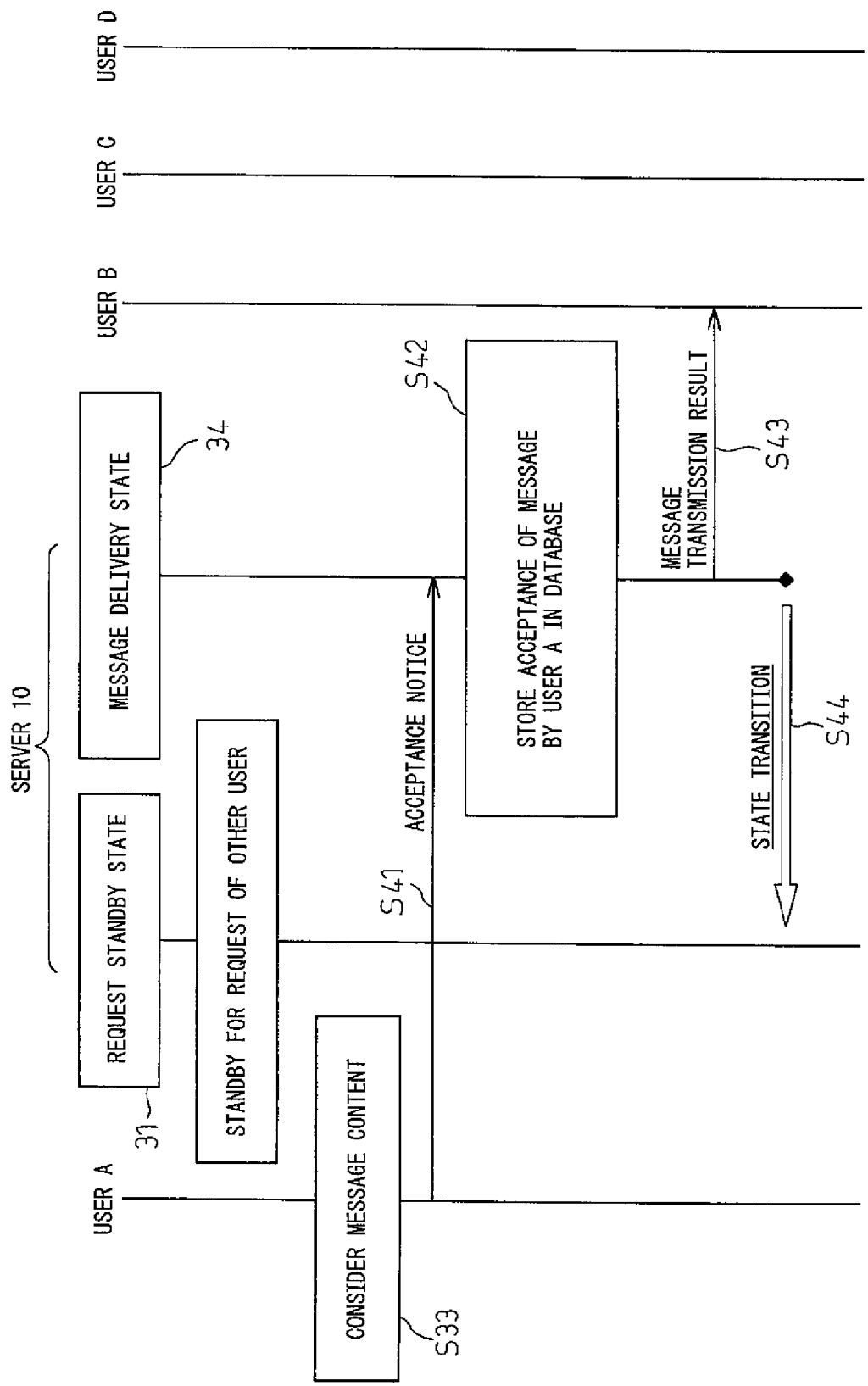
FIG. 7 is a view illustrating a flow of operation of an embodiment in the case where a user receiving a message accepts the message.

FIG. 7 is a view illustrating an operation where a member receiving a message in a designated area accepts that message.

The user A receiving a message considers the content of the message (S33). If for example able to perform the errand requested in the message and accepting that message, he sends an acceptance notice to the server 10 in the message delivery state (S41). The server 10 stores which member accepted the message in the database (S42). Next, the server 10 operates the message delivery function unit 12 and group management function unit 14 to notify the fact of acceptance of the message to the message sender, that is, the user B (S43). Furthermore, when there is a member already returning the message, the member returning the message is also notified of acceptance of the message (not shown). When the message sender is sent an acceptance message as a reply message from the accepting member, the acceptance message is also notified. After this, the server ends the message delivery state and shifts to the request standby state 31 (S44).

(Acceptance of Message after Return)

Figure 8:
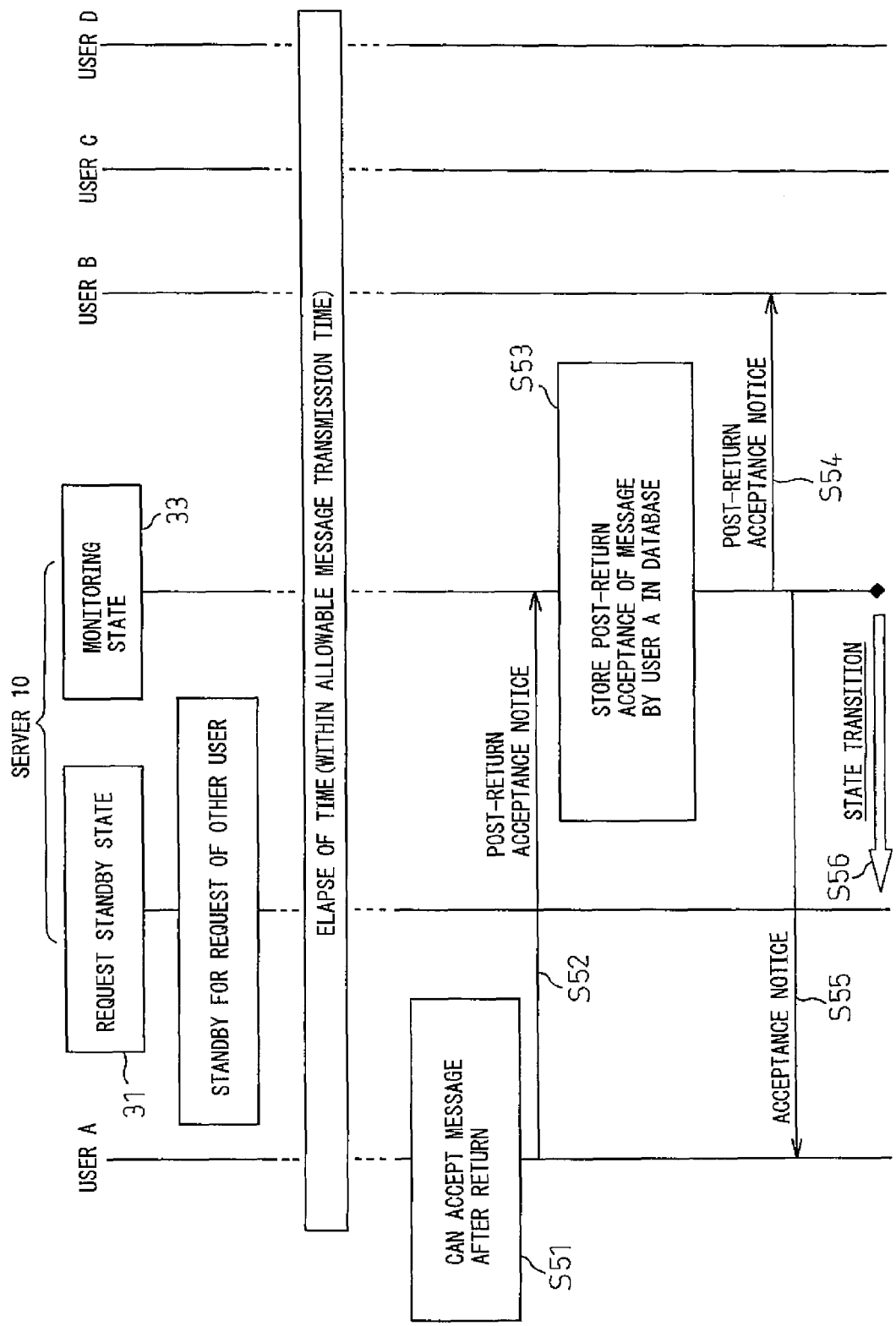
FIG. 8 is a view illustrating a flow of operation of an embodiment in the case where a user once rejects acceptance of the message, then accepts that message and where the server is in a monitoring state.
Figure 9:
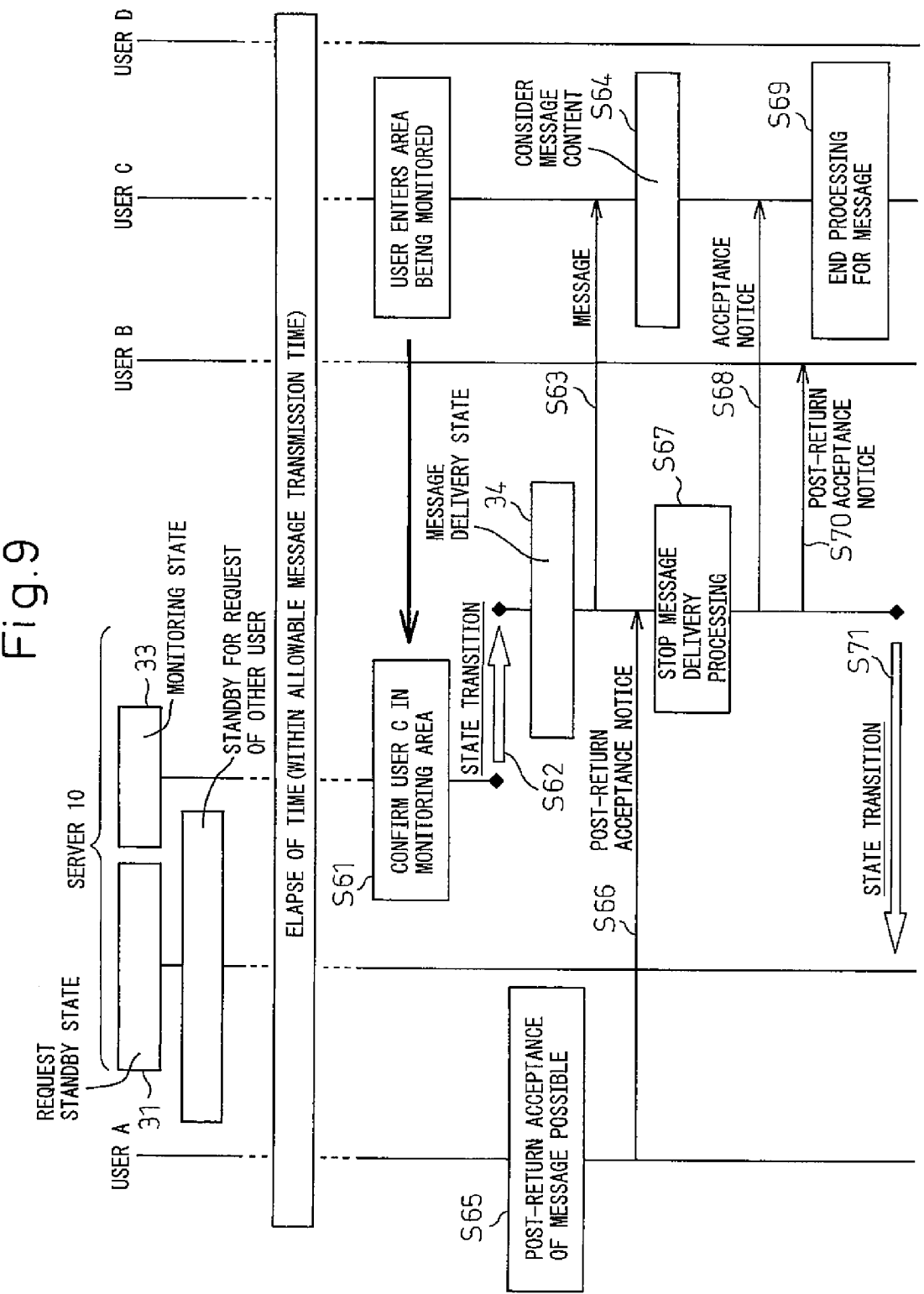
FIG. 9 is a view illustrating a flow of operation of an embodiment in the case where a user once rejects acceptance of the message, then accepts that message and where the server is in a message delivery state.

FIGS. 8 and 9 are views illustrating an operation when a member rejecting and returning a message later accepts that message. A member rejecting and returning a message can only later accept the message when that message has not been accepted by another member. In the present embodiment, if accepting a message after returning the message, later return is not allowed.

The procedure for acceptance after return of a message, that is, post-return acceptance, starts from when post-return acceptance of a message is sent from the member that has once returned the message. The operation differs depending on the state of the server at that time. FIG. 8 illustrates the operation in the case of the entry monitoring state where the server monitors entry of members into that area.

If a user A once rejecting acceptance of a message and returning the message is now in a state able to accept the message (S51), the user A uses the message control function unit 25 of his or her communication terminal 20 to notify post-return acceptance of the message to the server (S52).

The server 10 receiving the post-return acceptance of the message stores the fact of the user A accepting the message after once returning it in the database (S53). Next, the server 10 operates the message delivery function unit 12 and the group management function unit 14 to notify the message sender, that is, the user B, of the fact of acceptance of the message after return of the message (S54). Furthermore, the server notifies the user A of acceptance and confirms the post-return acceptance (S55). Further, if there is a member which returned the message up to then, the member is notified of the acceptance of the message.

The server 10 is in a monitoring state 33 monitoring entry of members into that area, so after this the server ends the monitoring process and shifts to the request standby state 31 (S56).

FIG. 9 is a view illustrating an operation in the case where the server is in a message delivery state and a user rejecting acceptance of the message and returning it then accepts that message.

First, when the server 10 is in the entry monitoring state, it confirms that the user C is in the monitored area, that is, the designated area designated by the user B (S61). Then, the server shifts to the message delivery state (S62). Further, the server 10 delivers the message to the user C (S63). The user C considers the message content (S64) and judges whether to accept the message.

At the same time, the user A that has once returned the message enters a state where it could accept that message due to a change in the situation (S65). Further, while the user C is considering the message content, the server 10 in the message delivery state is notified of post-return acceptance for acceptance of the message from the user A. The message received by the user C has still not been accepted by the user C. Therefore, the post-return acceptance by the user A is valid and the server 10 stops the message delivery processing (S67).

After ending the message delivery processing, the server 10 notifies the user C delivering the message that the message was accepted by another user (S68). That is, while the user C is considering the message content, the user C receives a note that another member has accepted that message. The user C learns that the message has been accepted by another member and ends the processing relating to the message (S69). Furthermore, the server 10 notifies the message sender attaching the message, that is, the user B, that the user A has accepted the message after once returning it (S70). The server 10 ends the processing, then shifts from the message delivery state 34 to the request standby state 31 (S71).

In the above way, when the server 10 is in a delivery state of delivering a message to a member entering the designated area and receives a post-return acceptance of the message, the server 10 stops the processing for message delivery to the members and informs the member that has delivered the message of the message being accepted as the acceptance notice. The timing of reception of the post-return acceptance by the server 10 requires to be earlier than the reception by the server 10 of the acceptance notice from the member currently sending the message.

(Return after Acceptance of Message)

Figure 10:
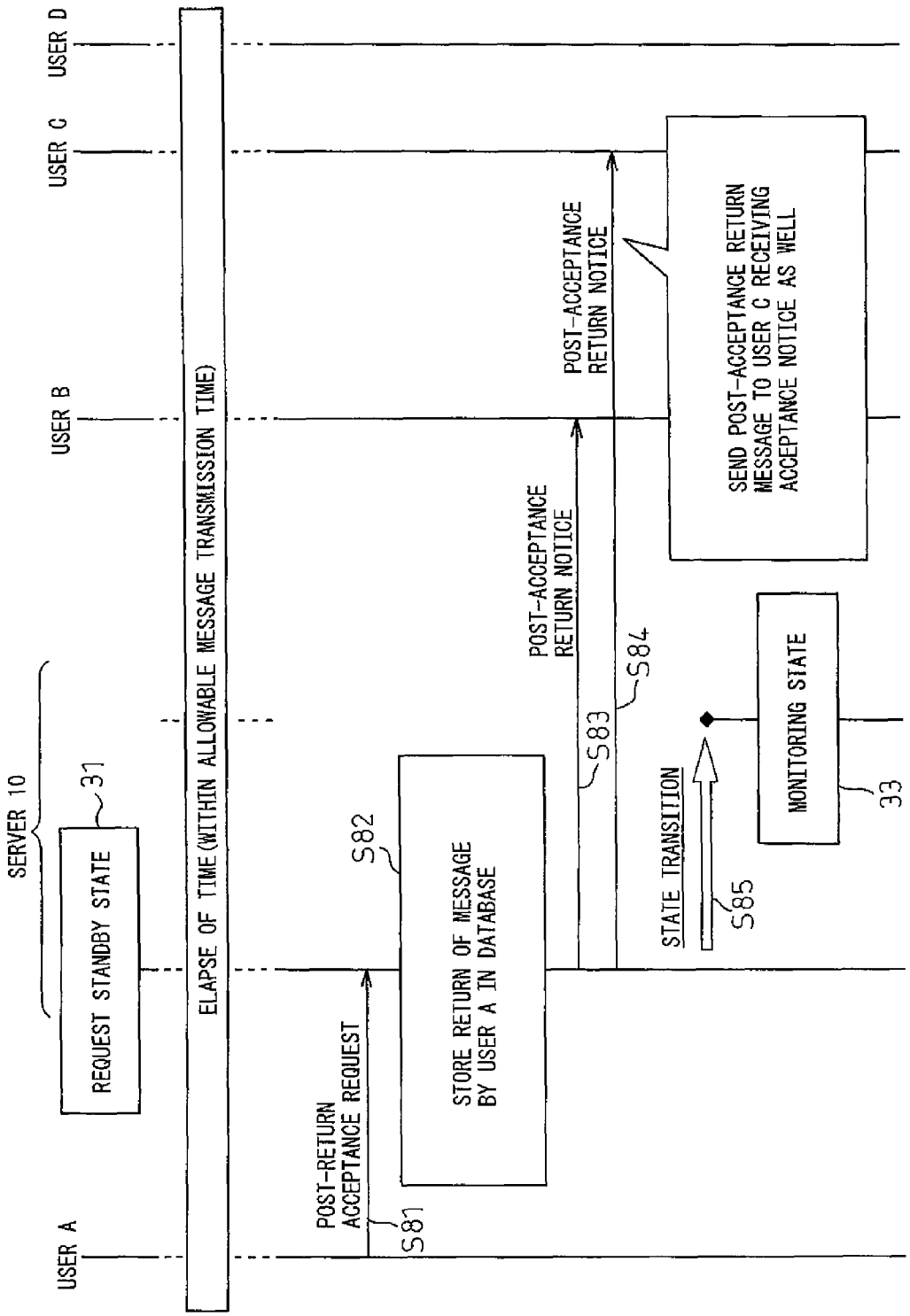
FIG. 10 is a view illustrating a flow of operation of an embodiment in the case where a user once accepts the message, then rejects acceptance of that message.

FIG. 10 is a view illustrating an operation when accepting a message, then returning acceptance of that message.

In FIG. 10, a user A once accepting a message from the user B later returns that message due to some sort of situation. The user A performs the processing for returning a message after once accepting that message, that is, post-acceptance return, by using the message control function unit 25 of the communication terminal 20 of the user A. The user A starts up the message control function unit 25 and makes a request for return of an accepted message (S81). The request for return after acceptance is only possible within the allowable time for message transmission.

If the server 10 receives a post-acceptance return request, the server A stores the fact of the user A returning the message after accepting the message in the database (S82). Then, the server 10 uses the message delivery function unit 12 and the group management function unit 14 to notify the message sender, that is, the user B, that there was a post-acceptance return (S83). Further, if there is a user returning a message before that message is accepted by the user A or another member receiving a message acceptance notice up to then, the other member is also notified of that post-acceptance return. In the present embodiment, the user C previously received a message acceptance notice, so is notified of the fact of a post-acceptance return (S84). If a return message is attached as a reply message from the user A, the return message is also notified attached to the post-acceptance return notice. If a user returns a message after accepting the message, the user is not allowed to accept again the message after the return. After all of the processing of the request standby state 31 ends, the server 10 shifts to the monitoring state 33 monitoring for a member entering the designated area (S55). In the monitoring state 33, if a member entering the designated area is discovered before the allowable time period for message delivery is past, the message is delivered.

In the present embodiment, member entry monitoring can usually be performed by a local station covering the designated location to which the message is attached. Furthermore, when the point for performance of the errand is determined, if the user of that group has entered the coverage area of that base station, as desired by the user, it is also possible to switch control to the GPS and guide the user accepting the message by GPS to the point for performance of the errand.

For example, at the timing at which the member of the group enters the designated area, the server 10 delivers the message including that the point for performance of the errand of the message is nearby. The member accepting the message can make use of GPS navigation when desiring to learn the exact location of the point for performance of the errand.

As explained above, in the present embodiment, by inquiring about the possibility of acceptance of an errand to members entering a designated area in the order of entry, it is possible to leave the acceptance of the errand to the schedules or decision-making of the individual members. Furthermore, since the errand is concealed from other members until a member receiving a request for an errand rejects it, there is no longer a need for coordination among members. The requested errand can be handled without coordination among members of the group. In particular, this is effective when requesting an unusual errand to any member of the group.

With simultaneous broadcast to all members by a conventional mailing list, multicast traffic occurred for coordinating which member would accept the errand, but in the present embodiment, it is possible to greatly reduce multicast traffic and make effective utilization of network resources.

Furthermore, it is possible to flexibly deal with changes in schedule of the individual members etc. by allowing cancellation after acceptance of a message and reacceptance after return of a message.

Note that, in the present embodiment, an errand which just one member of the group needed to accept a request for was explained, but the invention is not limited to this. It may also be an errand which several members of the group have to respond to a request for. In this case, the present embodiment may be repeatedly applied until the required number of members of the group accept the requested errand.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A message delivery system comprising:
a plurality of terminals and a server communicating the terminals; each of the terminals comprising
a message creation function unit creating a message for any member of a registered group and
a message delivery request function unit designating any location as a designated location and requesting a server to deliver the message to a member of the registered group entering the designated location; and
the server comprising
an entry monitoring function unit monitoring if a member of the registered group has entered the designated location and
a message delivery function unit delivering the message to a member of the registered group first entering the designated location and, if the first entering member refuses to accept the message, delivering the message to another member of the group next entering the designated area,
the server enabling the member to refuse to accept the message delivered to the member even after the message has been accepted, and enabling the member to accept a refused message if no other member accepts the message.

2. The message delivery system as set forth in claim 1, wherein the message delivery request function unit of a terminal designates a time period for delivery of the message to a member of the registered group.

3. The message delivery system as set forth in claim 1, wherein each of the terminals includes a group creation registration request function unit creating a group and requesting registration of the created group to the server, and the server includes a group registration receiving unit accepting the registration of the created group due to the request from the group creation registration request function unit.

4. The message delivery system as set forth in claim 1, wherein only members of the group can request delivery of a message.

5. The message delivery system as set forth in claim 1, wherein personal authentication is required when requesting delivery of the message.

6. The message delivery system as set forth in claim 1, wherein a predetermined member of the group can view the message requested to be delivered by the message delivery request function unit before delivery.

7. A message delivery method comprising:
monitoring if a member of a registered group has entered a designated location,
delivering a message to the member of the registered group first entering the designated location; and
delivering the message to another member of the group next entering the designated area if the first entering member refuses to accept the message,
enabling the member to refuse to accept the message delivered to the member even after the message has been accepted, and
enabling the member to accept a refused message if no other member accepts the message.

8. The message delivery method as set forth in claim 7, wherein the delivering is performed in a designated time period.

* * * * *